Patented May 9, 1939

2,157,133

UNITED STATES PATENT OFFICE 2,157,133

PROCESS OF EXTRACTING PHYSIOLOGICALLY ACTIVE MATERIALS FROM ANIMAL TISSUES

Havard L. Keil, Chicago, Ill., assignor to Armour and Company, Chicago, Ill., a corporation of Illinois No Drawing. Application June 3, 1936, Serial No. 83,403

6 Claims. (Cl. 167—74)

This invention relates to processes of isolating physiologically active materials, such as hormones and enzymes, from animal tissue, and it comprises processes wherein the animal tissue is finely minced and the hydrogen ion concentration thereof then so changed that the hormones or enzymes contained therein are released, become associated with the natural aqueous juice of the tissue, and are recovered therefrom.

Many different kinds of hormones and enzymes are present in animal tissues, for example hog liver contains physiologically active materials useful in the treatment of certain body conditions. Epinephrin can be obtained from the adrenals, thyroxine from the thyroids, insulin from the pancreas, secretin from the duodenum, etc. Present methods of extracting these hormones depend upon the action of acidified solutions, usually alcoholic, which physically extract the hormone. In other words, present extraction methods, as the word implies, make use of solvents for either the hormone itself, or the hormone which has been "activated" by the acid in the extracting liquid.

For example, secretin can be extracted from the duodenum by processes involving the treatment of minced duodenum with relatively large volumes of acidified alcohol solutions and the secretin subsequently recovered from its extraction liquid. Many extraction processes now used require a heating step either in the extraction per se or in the purification of the extracted hormone. Others require the use of precipitating agents to free the extract of impurities and still others must utilize alcoholic solutions strong enough to precipitate proteins. All of these methods have disadvantages. Many of the physiologically active materials it is desired to isolate are destroyed by heating, still others are precipitated and lost by the ammonium sulfate used as a protein precipitant, and still others are not soluble in the strong alcohol solutions required to free the material of proteins. In the latter instance, large quantities of the desired hormone are actually precipitated with the protein impurities. Moreover, the wide use of alcoholic extraction solutions is expensive since alcohol recovery is not complete.

Of late, methods using absorbent materials have been proposed. This has been more an effort to avoid the addition of large amounts of aqueous extracting solutions. Although solid absorbent materials are an important step forward in the art, such absorbent action is usually rather specific and is not particularly satisfactory. The hormone must be recovered from the absorbent and in doing this, many of the disadvantages sought to be overcome by the absorbent method actually reappear.

What is desired in this art is some method of isolating hormones and other physiologically active constituents of animal tissue which avoids the use of large volumes of extraction liquids. At the same time, such a method should avoid the necessity for drastic purification which invariably results in marked losses of the very hormone it is desired to isolate. In other words, the art has long desired a method by means of which the hormone can be isolated under conditions which avoid the necessity for drastic purification methods and large volumes of extraction solutions.

I have now discovered a method which meets the above requirements. My method can be characterized as a "solventless" extraction method in that I do not treat the animal tissue with a solvent or an extraction fluid. In my method, I am able to use the normal tissue juice as the liquid phase in which the physiologically active materials collect. In most glandular material the natural tissue juice is roughly 70 to 80 percent of the tissue. In my process I so treat the glandular material that the hormones are liberated from the cells of the tissue and collect or dissolve in the tissue juice. Consequently, I am able to avoid treatment of the tissue with large volumes of solvents and thus I avoid much of the expense hitherto considered an evil in the extraction of animal tissue.

Before proceeding with a detailed description of the application of my invention to certain specific materials, it will aid in an understanding of the principles of my invention if I describe the colloidal chemical phenomena which I put to use. This will likewise help to distinguish the fundamental principles of my invention from extraction methods hitherto used in the art.

Hormones and similar physiologically active materials are normally intracellular. That is to say, they are found inside the individual cells of the animal tissue. When animal tissue, such as the duodenum, is finely minced there is obtained a pulpy mass composed of a relatively large volume of tissue juice in which the individual cells of the tissue can be visualized as in suspension. In other words, the minced material can be looked upon as an aqueous pulp of animal tissue cells. Naturally the cells are of microscopic size. The hormone which it is desired to isolate is within the cells themselves and is not associated with the continuous liquid phase of the pulp. In present processes the action of large volumes of aqueous or alcoholic acid solutions appears to break down the cells chemically and thus liberate the hormone. In some instances, however, the action of large volumes of acidified water or alcohol may not result in an actual splitting or break down of the protein cell. Some of the hormones may be loosely linked chemically to the cell by residual valence bonds and the small amount of acid in the extracting solution may destroy this valence bond and free the hormone from the cell. Just what the true explanation is cannot be stated with finality. The fact remains, however, that the usual methods of separating the hormone from the protein cells with which it is associated tend to destroy some of the hormone. All methods involving heat, the addition of large volumes of alcohol, or salting out inevitably lead to losses of hormone which could otherwise be recovered.

The present invention is based upon the application of colloidal chemical principles not hitherto used in this art. In my process I cause the cells of the tissue to swell until finally a point is reached where the cell wall ruptures and the hormone is released. The aqueous fluid used for swelling the protein cell is the natural tissue juice although I do add small quantities of water as a carrier for the agents which cause the cell to swell. The amount of water added, however, is far below that customarily used as a solvent or extraction medium for the hormone.

To put it another way, the hormone can be considered as a substance which is within the confines of the tissue cell. When agents which cause the protein cell material to swell are added each individual cell imbibes much water from the natural aqueous juices of the tissue until so much water has been taken up that the cell wall actually ruptures. Swelling is associated with a great increase in viscosity of the minced tissue and is directly related to the hydrogen ion concentration of the tissue. The principle involved can be more easily understood by reference to the action of gelatin.

Normal gelatin will have a hydrogen ion concentration at the isoelectric point of about pH 4.7. When diluted hydrochloric acid is added thereto, the gelatin begins to swell and at a pH of about 3.2 maximum swelling occurs. The solution becomes highly viscose and gels. This point can be defined as the point of "maximum hydrophillation". In other words, at this hydrogen ion concentration the gelatin has absorbed the maximum amount of water which it can take up. Further additions of acid then cause a decrease in swelling and in viscosity. Similarly, when dilute alkali is added to gelatin, the gelatin begins to swell and reaches a maximum swelling at a pH of about 10. This swelling action is, of course, the result of the individual cells of the cellular gelatin structure imbibing water so that the cells themselves greatly increase in size. The complex protein cells of animal tissue and glands behave similarly to the relatively simple gelatin molecule. As the hydrogen ion concentration of the animal tissue increases or decreases from the isoelectric point, the animal tissue cells begin to swell and finally rupture. It is this principle of protein swelling that I use in my invention except that the bulk of the water taken up by the tissue cells is derived from the normal tissue juices. At the completion of the swelling, the cells rupture, the hormones within the cells are liberated, and these hormones become a part of the colloidal system itself. In other words, they have been transferred from within the tissue cell to the colloidal system composed of ruptured, hydrated cell tissue and tissue juice. Thereafter all I need to do is add to the colloid system a substance such as sodium chloride or other inorganic salt to break the system down, whereupon the proteins precipitate but the hormones remain in the supernatant tissue juice.

In broad aspects, my process includes the steps of treating minced animal tissue or glandular material containing its normal content of animal tissue juice with small amounts of either an acid or an alkali until the mixture becomes quite stiff, which indicates maximum swelling, and then add to the mixture a salt, or other ionizable material which will cause swollen proteins to "dehydrate" and precipitate. This dehydration is really the result of changing the hydrogen ion concentration of the protein so that it approaches or reaches the isoelectric point and precipitates. All of the salts used, such as sodium chloride, ordinary sodium phosphate, sodium sulfate, sodium acetate, and the like, act to depress the hydrogen ion concentration of gelatin which has been swollen with acids such as hydrochloric. These salts also act to depress the swelling of gelatin which has been swollen in an alkali. Thus, for example, when sodium chloride is added to swollen gelatin at a pH of about 3, the viscosity and swelling decreases until the mixture is almost as fluid as water.

This principle of inducing swelling in animal tissues and glands to release the intracellular hormones can, as stated, be used for the separation of all of the common hormones as well as enzymes. For example, it can be used for the extraction of epinephrin from minced adrenalin glands, hormones from the pituitary gland, the thyroid gland, pancreas, the recovery of sex hormones etc. Whether the animal tissue or gland is to be swollen by addition of an acid or an alkali will depend upon the type of hormone to be extracted. When isolating epinephrin, thyroxine and sex hormones it is better to swell the minced material by the addition of dilute alkali thereto. Most other hormones are unaffected by the dilute acid used to induce swelling by increased hydrogen ion concentration.

I shall now give a detailed example of the application of my invention to the recovery of physiologically active materials from hog livers but it will be understood by those skilled in the art that similar process steps can be applied to the various other phsiologically active materials enumerated above. The process of the present invention is of general application in this art and it would serve no useful purpose to describe in detail the extraction of physiologically active materials from all of the various tissues and glands containing the same.

Fresh hog livers are finely divided and minced to as near the colloidal state as possible with ordinary grinding machines. After this has been done, tissue cells can be visualized as being in suspension in the natural tissue juice of the livers. The mass is rather pulpy although the actual viscosity of it will, of course, depend upon the extent of grinding and defibrination. This mixture is then chilled to about 5 to 10° C. At this point I may mention that all of the steps in my process are conducted at room temperature so that there is no possibility of destroying heat labile compounds. In fact, chilling is advantageously employed to positively prevent any tendency for enzyme action or deterioration to occur.

To 100 pounds of this pulped mixture I then add a sulfuric acid solution composed of 10 pounds of water and about 1130 cubic centimeters of concentrated sulfuric acid. This is, of course, an extremely dilute solution of sulfuric acid but the amount of the solution, a little over one-tenth of the weight of the minced liver, is far less than would ever be useful in extraction processes as hitherto employed. Advantageously the sulfuric acid solution is cooled to about the temperature of the liver and then added very slowly with vigorous agitation. The mixture stiffens promptly, thus indicating that the increase in hydrogen ion concentration of the protein cells in the tissue has caused the material to swell. After all the acid has been added, the mixture is quite thick and jelly-like and at this point the colloidal system comprises swollen protein cells which have ruptured, animal tissue juices, and physiologically active materials free from the confines of the cells. I then add 20 pounds of sodium chloride to the mixture. The sodium chloride dissolves in the aqueous phase and causes the gel to break down. The protein material composing the cells is rendered insoluble and precipitates. More accurately speaking, the sodium chloride causes an immediate decrease in the hydrogen ion concentration of the protein with an immediate decrease in the swelling so that the protein approaches its isoelectric point, becomes insoluble, and precipitates. The physiologically active material is in the clear amber colored supernatant liquor. Advantageously, the mixture prior to filtration is allowed to settle over night at room temperature, about 0° C. in order to allow ample time for the proteins to granulate.

The next day the mixture is filtered and the filtrate recovered for further treatment. The filtrate may contain some nucleic acids or fragments thereof and also some acid meta-proteins. In order to remove these, I advantageously neutralize the filtrate with caustic soda solution until the pH is increased to about 5 or 6. At this point a white curd appears which can be readily filtered off. The filtrate is concentrated in vacuo at a low temperature to dryness. The temperature need not exceed normal room temperature during the evaporation. The dried material thus obtained is composed of sodium chloride and the physiologically active material together with very small amounts of impurities such as sugars and proteins showing the biuret reaction. The dry material is then ground fine and extracted with absolute methyl alcohol or other solvent, filtered, and the filtrate concentrated to a heavy paste in vacuo. This extraction frees the material of its salt content. Advantageously the paste is again taken up in a very small amount of methyl alcohol, just enough to give a filterable mass, and again filtered. Methyl alcohol is used in the manner described in order to free the physiologically active material of salt and the lower forms of proteins within the peptone range. The filtrate last mentioned is next mixed with three volumes of dry acetone, which precipitates the physiologically active material, the physiological active material is filtered off, and spread thin on enameled pans upon which it is dried in vacuum. The final product is free of biuret producing proteins and does not give a Fehlings test for sugar. The hormone can be dissolved in water and used for intramuscular injections or for oral administrations.

Sometimes it is advantageous to freeze the liver mixture while it is at its point of maximum hydration after the addition of sulfuric acid. During the freezing, water within the cell walls, or within those cells which have not ruptured, crystallizes and thus helps to break up the cells. This freezing step is, however, not usually essential and is simply an adjunct in my process. After the freezing operation the material is thawed and salt added as described above.

From the foregoing description it will be apparent that the essence of my invention resides in causing the animal tissue or glands to swell which results in rupturing the cells and release of hormones. Any of the common mineral acids, or organic acids which are water soluble, and any of the common alkalis can be used to so change the hydrogen ion concentration that maximum swelling is realized. Sulfuric acid is one of the best acids to use since it not only lowers the pH value but it also precipitates histones and protamines. The hydrochlorides and acids of these substances are soluble whereas the hydrosulfates are not.

Those skilled in the art may readily determine the precise quantity of acid or alkali necessary to insure maximum swelling by simply treating the minced glands or tissue with a dilute solution, in small amount, of either an acid or an alkali until the point of maximum viscosity or gelling occurs. This may be determined readily by visual inspection.

There are many different inorganic salts which can be used to break the colloid system after maximum swelling has been achieved. Sodium chloride is one of the best but I do not wish to be limited thereto. Sodium sulfate, sodium phosphate, calcium chloride, and other salts can be used.

The amount thereof to be used may, of course, vary. Here again visual inspection will readily show when enough salt has been added. Salt is added until the gel has been completely broken down and the supernatant liquid is easily filtered from the precipitated protein. After the colloid system has been broken by the addition of a salt thereto an additional quantity of water, amounting to not more than about 10 percent of the original weight of the liver can be added but to no particular advantage. The precipitated protein material formed after the addition of the salt can, of course, be pressed to remove the last traces of available juice.

Those process steps following the recovery of the aqueous tissue juice containing the hormone but freed from the cell proteins will be obvious to those skilled in the art. They simply involve evaporation of the animal juice, separation of salt from the dried product, and removal of any remaining slight traces of protein decomposition products. I therefore do not intend to be limited to any particular method of working up the solution of hormones in the animal tissue juice.

For purposes of extracting hormones from the duodenum the procedure is substantially the same. The duodenum is finely minced, a small amount of dilute acid added thereto until the material swells to a gelly-like mass, salt is then added to break down the gel and precipitate the ruptured protein cells which are filtered off and the aqueous filtrate compound of the tissue juice, hormone, and salt is then worked up for the isolation of the hormone. The simplest way to do this is that described above in connection with the treatment of hog livers.

In the isolation of thyroxine, the thyroid gland is minced to an aqueous pulp, dilute caustic alkali added until a point of maximum swelling, usually at a pH of about 10, is reached, salt then added and the aqueous mixture freed of the precipitated proteins and worked up for the removal of salt therefrom and precipitation of any residual proteins.

In the appended claims I use the language "animal tissue" to denote hormone-containing animal tissue and glands. Likewise I use the word "absorption" to designate the action of the proteins in taking up water. Absorption, used in this way, is intended to be the same as "hydration" or "occlusion", words which are also used in the art to denote the swelling of proteins on taking up water.

Having thus described my invention, what I claim is:

1. The process of isolating intracellular physiologically active substances from animal tissue containing the same which comprises finely mincing the animal tissue to form a suspension of protein tissue cells in a liquid menstruum composed substantially of the natural tissue juice itself without the addition of substantial quantities of aqueous fluids thereto, changing the hydrogen ion concentration of the mixture of cells and juice to cause the cells to swell and rupture by absorption of the liquid menstruum composed substantially of the tissue juice and without the addition of substantial amounts of water so that the mass assumes a plastic and gelatinous state composed of swollen ruptured protein cell material and a liquid menstruum composed substantially of the tissue juice itself and active substances released from the confines of the cells, and then separating the protein cell material from said liquid menstruum.

2. The process of isolating intracellular physiologically active substances from animal tissue containing the same which comprises finely mincing the animal tissue to form a suspension of protein tissue cells in a liquid menstruum composed substantially of the natural tissue juice itself without the addition of substantial quantities of aqueous fluids thereto, changing the hydrogen ion concentration of the mixture of cells and juice to cause the cells to swell and rupture by absorption of the liquid menstruum composed substantially of the tissue juice and without the addition of substantial amounts of water so that the mass assumes a plastic and gelatinous state composed of swollen ruptured protein cell material and a liquid menstruum composed substantially of the tissue juice itself and active substances released from the confines of the cells, precipitating protein cell material from said liquid menstruum, separating the precipitated cell material, and recovering the physiologically active substances from the liquid menstruum.

3. The process as in claim 1 wherein the protein cells are caused to swell and rupture by increasing the hydrogen ion concentration of the mixture of cells and natural tissue juice.

4. The process as in claim 2 wherein the protein cells are caused to swell and rupture by increasing the hydrogen ion concentration of the mixture of cells and natural tissue juice.

5. The process of obtaining physiologically active substances from animal livers which comprises finely mixing the livers to form a suspension of tissue cells in a liquid menstruum composed substantially of the natural tissue juice without the addition of substantial quantities of aqueous fluids thereto, adding a small amount of dilute mineral acid to the minced liver material, much less than the quantity of livers, to cause the tissue cells to swell and rupture by absorption of aqueous fluids present composed substantially of the natural tissue juice and thus release the physiologically active substances, the mixture assuming a plastic state, then adding a protein precipitant to precipitate the protein cell materials, separating the insoluble proteins from the liquid menstruum composed substantially of the tissue juice and the physiologically active substances, and recovering the physiologically active substances from the liquid menstruum.

6. The process as in claim 5 wherein the mineral acid is sulfuric acid.

HAVARD L. KEIL.